(12) United States Patent
Cui (10) Patent No.: US 12,454,028 B2
(45) Date of Patent: Oct. 28, 2025

(54) WIDE LASER BEAM HIGH-THROUGHPUT ADDITIVE-MANUFACTURING AND CLADDING DEVICE AND WORKING METHOD THEREOF

(71) Applicant: OCEAN UNIVERSITY OF CHINA, Shandong (CN)

(72) Inventor: Hongzhi Cui, Shandong (CN)

(73) Assignee: OCEAN UNIVERSITY OF CHINA, Qingdao (CN)

( * ) Notice: Subject to any disclaimer, the term of this patent is extended or adjusted under 35 U.S.C. 154(b) by 0 days.

(21) Appl. No.: 19/170,736

(22) Filed: Apr. 4, 2025

(65) Prior Publication Data

US 2025/0289079 A1    Sep. 18, 2025

Related U.S. Application Data

(63) Continuation of application No. 18/968,518, filed on Dec. 4, 2024, now abandoned.

(30) Foreign Application Priority Data

Jan. 26, 2024   (CN) .......................... 202410113446.9

(51) Int. Cl.
  *B23K 26/342*   (2014.01)
  *B22F 10/28*    (2021.01)
  (Continued)

(52) U.S. Cl.
  CPC ............ *B23K 26/342* (2015.10); *B22F 10/28* (2021.01); *B22F 12/41* (2021.01); *B23K 26/032* (2013.01);
  (Continued)

(58) Field of Classification Search
  CPC ......... B33Y 30/00; B33Y 10/00; B33Y 50/02; B33Y 40/00; B23K 26/342; B23K 26/144;
  (Continued)

(56) References Cited

U.S. PATENT DOCUMENTS

| | | | |
|---|---|---|---|
| 8,097,825 B2 * | 1/2012 | Sato | B23K 35/0244 219/84 |
| 2015/0053656 A1 * | 2/2015 | Popp | B23K 28/02 219/121.48 |

(Continued)

*Primary Examiner* — Chris Q Liu
(74) *Attorney, Agent, or Firm* — Weiss & Moy, PC; Jeffrey D. Moy (57) ABSTRACT

The present disclosure relates to a wide laser beam high-throughput additive-manufacturing and cladding device and a working method thereof, and belongs to the field of surface engineering for materials. In the present disclosure, an external optical fiber is connected to an optical fiber interface to input a laser, and the laser passes through a collimating lens, a diffractive optical element (DOE), a concentrating lens, and a protective lens successively, such that a wide laser beam laser beam is output at an outlet of a nozzle, with a beam width of 20 mm to 40 mm. Two powder-feeding tanks are connected to a powder-feeding interface of the nozzle through a powder-feeding pipe. A cooling water pipe is connected with a plurality of water-cooling interfaces to form a circulation. An external shielding gas is connected to a shielding-gas interface to provide a central shielding gas.

8 Claims, 4 Drawing Sheets

(51) Int. Cl.
*B22F 12/41* (2021.01)
*B23K 26/03* (2006.01)
*B23K 26/067* (2006.01)
*B33Y 10/00* (2015.01)
*B33Y 30/00* (2015.01)

(52) U.S. Cl.
CPC .......... *B23K 26/0676* (2013.01); *B33Y 10/00* (2014.12); *B33Y 30/00* (2014.12)

(58) Field of Classification Search
CPC ............ B23K 26/0734; B23K 26/0665; B23K 26/0643; B23K 26/073; B23K 26/08; B23K 26/082; B23K 26/032; B23K 26/0626; B23K 26/064; B23K 26/0648; B23K 26/0652; B23K 26/127; B23K 26/14; B23K 26/1464; B23K 26/1476; B23K 26/16; B23K 26/34; B23K 26/348; B23K 26/703; B23K 10/00; B23K 10/02; B23K 15/0086; B23K 2103/10; B23K 2103/12; B23K 2103/14; B23K 2103/18; B23K 26/0093; B23K 26/03; B23K 26/06; B23K 26/0604; B23K 26/0608; B23K 26/0613; B23K 26/0617; B23K 26/0823; B23K 26/0853; B23K 26/0876; B23K 26/103; B23K 26/122; B23K 26/123; B23K 26/146; B23K 26/1462; B23K 26/32; B23K 26/705; B23K 28/02; B23K 35/0244
USPC ............ 219/121.39, 121.44, 121.45, 121.46, 219/121.48, 121.51, 121.52, 121.59, 63, 219/64, 65, 66, 84
See application file for complete search history.

(56) References Cited

U.S. PATENT DOCUMENTS

| | | | |
|---|---|---|---|
| 2017/0129180 A1* | 5/2017 | Coates | B23K 26/0093 |
| 2017/0304946 A1* | 10/2017 | Shibazaki | B33Y 30/00 |
| 2017/0304947 A1* | 10/2017 | Shibazaki | B22F 10/25 |
| 2018/0159459 A1* | 6/2018 | Mills | G21B 3/00 |
| 2020/0101564 A1* | 4/2020 | Shibazaki | B33Y 30/00 |
| 2020/0108464 A1* | 4/2020 | Shibazaki | B29C 64/153 |
| 2022/0008996 A1* | 1/2022 | Holfelder | B23K 26/342 |
| 2022/0362885 A1* | 11/2022 | Shi | B23K 26/0665 |
| 2022/0371124 A1* | 11/2022 | Shi | B22F 10/25 |

* cited by examiner

WIDE LASER BEAM HIGH-THROUGHPUT ADDITIVE-MANUFACTURING AND CLADDING DEVICE AND WORKING METHOD THEREOF

CROSS REFERENCE TO RELATED APPLICATION

This patent application claims the benefit and priority of Chinese Patent Application No. 2024101134469, filed with the China National Intellectual Property Administration on Jan. 26, 2024, the disclosure of which is incorporated by reference herein in its entirety as part of the present application.

TECHNICAL FIELD

The present disclosure relates to a wide laser beam high-throughput additive-manufacturing and cladding device and a working method thereof, and belongs to the technical field of surface engineering for materials.

BACKGROUND

With the continuous movement of resource development towards the deep sea, the deep earth, and the deep space, advanced requirements have been put forward for the safety of working of large-scale engineering equipment in extreme environments and the service lives of key components. The development of an efficient protection technology for a surface of a workpiece and an appropriate protective material as quickly as possible is an effective way to improve the performance of large-scale engineering equipment.

There have been a large number of technical reports and engineering applications. The patent publication CN111926324A discloses an integrated wide-beam deep-hole laser cladding head. In this patent, upper and lower air knife structures are innovatively arranged, which can effectively protect the laser cladding head and improve a cladding efficiency. In this patent, a camera shooting function is also innovatively arranged to observe a molten pool, a powder-spreading state, and a quality of a cladding surface in real time, such that an operator can find cladding quality problems in real time. The patent publication CN111254432A discloses a full water cooling high-power inner hole broad-band cladding head. In this patent, a laser reflecting mirror module assembly is provided to reflect collimated light passing through a light transmission pipe assembly at a right angle, such that a round beam is converted into a wide beam. In this patent, a powder feeding nozzle assembly is provided to divide a path of a metal powder into a plurality of paths and converge each path with a wide beam to the same point, which effectively solves the problems that the traditional laser head cannot meet the requirements of inner hole repairing and a processing efficiency is low. The patent publication CN111577928A discloses a high-wear-resistance ball valve based on a high-speed laser cladding technology and a preparation method of the high-wear-resistance ball valve. In this patent, a transition layer is first prepared on a surface of a ball valve by the high-speed laser cladding technology, then a specific high-hardness alloy powder layer is accurately cladded on the basis of the transition layer, and then remelting is conducted by wide-beam laser scanning to improve a surface quality. This patent solves the problem that the manufacturing of a high-wear-resistance alloy layer by the traditional laser cladding requires preheating and is prone to defects such as cracks. The patent publication CN111593340A discloses a laser cladding method for an inner wall of a hydraulic support oil cylinder. In this patent, the laser cladding is conducted with a wide-beam paraxial broadband powder feeding laser cladding device to form a cladding layer. This patent takes into account the advantages of both a wide-beam laser cladding technology and an oblique angle coaxial laser cladding technology, and reduces a production cost of cladding for an inner wall of a hydraulic support oil cylinder. The patent publication CN111088491A discloses a rectangular laser cladding powder feeding nozzle with an adjustable powder feeding width. A powder output width of the rectangular laser cladding powder feeding nozzle can be easily changed as needed without re-designing and processing the rectangular laser cladding powder feeding nozzle. This patent solves the problem that the traditional wide-beam laser cladding powder feeding nozzle has a fixed form and is not easily replaced. The patent publication CN110923705A discloses a multifunctional powder feeding system, including a laser, a powder feeder, a regulating mechanism, a wide-beam powder feeding channel, a protective gas blowing channel, and a powder-feeding water-cooling channel. In this patent, with a wide-beam powder feeding hole centered, the protective gas blowing channel and the powder-feeding water-cooling channel are fixed up and down sequentially, which allows a compact structural arrangement, reduces a volume, and is convenient to operations. The patent publication CN110453217A discloses a wide-beam deep-hole laser cladding head. This patent solves the development bottleneck problem of the existing deep-hole laser cladding technology, allows a continuous and stable operation, high integration, and a small size, and has a promising application prospect. The patent publication CN109317857A discloses a flat continuous welding wire for rectangular energy beam welding and a use and preparation method thereof. A cross section of the flat continuous welding wire is a rounded rectangular cross section or an oblate rectangular cross section, and has a width range of 3 mm to 30 mm and a thickness range of 0.3 mm to 1.0 mm. The flat continuous welding wire is a solid welding wire or a powder-cored wire. The flat continuous welding wire is provided for rectangular energy beam welding, such as wide-beam laser welding and wide-beam electron-beam welding. A specific size can be designed to well adapt to rectangular energy beam welding, which solves the problem that the existing welding wires are not applicable to continuous rectangular energy beam welding, and expands the application fields of welding wires. The patent publication CN104611515A discloses an adjustable wide-beam reflective-focusing laser inner hole quenching working head. This patent can improve the hardness, wear resistance, and corrosion resistance of an inner wall of a component, reduce a use cost of a component, extend a service life of a component, and ensure the long-term and effective inner hole quenching.

In addition, various high-throughput technologies have been disclosed. The patent publication CN114713845A discloses a laser rapid prototyping preparation method of high-throughput metal samples, and belongs to the technical field of high-energy beam rapid prototyping preparation of materials. In the laser rapid prototyping preparation method, the full-program control of a multi-channel powder-feeding cartridge is implemented through equipment upgrades and software program updates. Process parameters and/or material components of a high-throughput material design are written as variables into a path program for a single sample. Then, a code is edited to determine a position of each sample, and the code is used to run a path program for each sample, that is, a laser rapid prototyping process can be controlled in a full-process and full-automatic manner by running a program file. This patent can meet the requirements of high-throughput material preparation for a large quantity of samples at one time, and allow the rapid screening of alloy component ratios and the rapid optimization of process parameters for material preparation. The patent publication CN109971929A discloses a high-throughput material preparation and performance characterization system. Compared with the prior art, the high-throughput material preparation and performance characterization system disclosed by this patent can simultaneously overcome the disadvantages of an unstable workpiece transfer speed and an uncontrollable workpiece temperature after heating, and can improve an accuracy of a test. The patent publication CN109207995A discloses a plasma cladding preparation system for a high-throughput abrasion-resistant material and an implementation method of the plasma cladding preparation system. The plasma cladding preparation system includes a plurality of material tubes, first powder-feeding mechanisms, at least one stirring tank, a powder storage tank, a set of second powder-feeding mechanisms, and a plasma generator that are arranged from top to bottom. Each material tube corresponds to a set of first powder-feeding mechanisms. During an implementation, a required powder is placed in each material tube, a speed of a servo motor of a powder-feeding mechanism for each material tube is adjusted, such that a powder in each material tube falls into a stirring tank below according to a designed proportion and powders are thoroughly stirred and then delivered to the powder storage tank for plasma cladding. In this patent, abrasion-resistant coatings or functionally-gradient materials of various formulas and from different processes can be directly prepared on the same metal substrate at one time, which can reduce the experimental errors. The patent publication CN108330456A discloses a device for high-throughput material preparation and a use of the device. In this patent, magnetron sputtering deposition is conducted in different ratios to prepare a series of new materials. This patent can allow the continuous high-throughput production, and greatly facilitates the research and development of new materials and the construction of material genome libraries. The patent publication CN105891243A discloses a two-dimensional continuous component sample, a preparation method of the two-dimensional continuous component sample, and a use of the two-dimensional continuous component sample in high-throughput rapid determination of a phase diagram. The two-dimensional continuous component sample of this patent is an equilateral triangular sheet, and a component distribution of the two-dimensional continuous component sample is consistent with a component distribution in a ternary phase diagram represented by an equilateral triangle. The two-dimensional continuous component sample can be prepared by the following three methods: a solid-phase reaction method, a three-dimensional (3D) printing method, and a slurry or suspension mixing method, and is annealed or quenched at an appropriate temperature to meet the requirements of phase diagram determination and material screening. This patent can greatly increase the numbers of samples with different compositions that are synthesized at a single time, and provides the high-throughput sample support for high-throughput screening of materials and rapid determination of ternary phase diagrams.

The above patents can improve the efficiencies of additive manufacturing and cladding and the optimization efficiencies of a material composition and process to varying degrees. However, there is no device and technical report that integrate the functions such as wide laser beam laser additive manufacturing and cladding, high-throughput optimization, and accurate composition control, which seriously restricts the high-efficiency protection for large-scale workpieces working in extreme environments and the matching design for material components.

SUMMARY

For a large number of large-scale workpieces working in ablation, abrasion, high-temperature, and low-temperature environments, the high-efficiency protection is required, and protective materials need to be designed in a targeted manner. In view of this, the present disclosure provides a wide laser beam high-throughput additive-manufacturing and cladding device and a working method thereof. Specifically, the device has functions such as wide laser beam laser additive manufacturing and cladding, high-throughput optimization, and accurate composition control. The device can conduct high-efficiency additive manufacturing and cladding with a laser beam having a beam width of 20 mm to 40 mm for a large-scale workpiece to obtain a single or a plurality of metallurgically-bonded additive manufacturing and cladding layer(s). With the device, a component can be controlled accurately in a continuous and boundary-leap manner to obtain a high-throughput sample array with different compositions. Components can be rapidly optimized and screened by comparing relationships between components and properties. Therefore, the present disclosure can provide an appropriate composition and a high-efficiency protection technology for a large-scale workpiece working in an extreme environment.

To achieve the above objective, the present disclosure adopts the following technical solutions:

In a first aspect, the present disclosure provides a wide laser beam high-throughput additive-manufacturing and cladding device, including a wide laser beam cladding head, a high-throughput powder-feeding system, and a mechanical motion system, where the wide laser beam cladding head is fixed on the mechanical motion system through a flange-arranging plate; the high-throughput powder-feeding system is configured to adjust a mass of a powder to be fed, and includes a powder-feeding tank A and a powder-feeding tank B;

the wide laser beam cladding head includes a laser shaping structure and a gas-powder mixing path structure for synchronous powder feeding; the laser shaping structure includes a collimating lens, a diffractive optical element (DOE), a concentrating lens, and a protective lens; the gas-powder mixing path structure for the synchronous powder feeding includes an optical fiber interface, a water-cooling interface, a central shielding gas, a focus-adjusting sleeve, and a nozzle; the powder-feeding tank A and the powder-feeding tank B are connected to a powder-feeding interface of the nozzle through a powder-feeding pipe; a cooling water pipe of an external cooling-water machine is connected with a plurality of water-cooling interfaces to form a cooling water circulation; an external shielding gas is connected to a shielding-gas interface of the wide laser beam cladding head to provide the central shielding gas; and an external optical fiber is connected to the optical fiber interface to input a laser, the laser passes through the collimating lens, the DOE, the concentrating lens, and the protective lens successively, and a wide laser beam is output at an outlet of the nozzle.

Preferably, a powder-feeding groove is formed at each of two sides of the nozzle; a powder is ejected through the powder-feeding groove; an outlet of the powder-feeding groove is a rectangular powder-feeding outlet, and the rectangular powder-feeding outlet is divided into 7 or more small rectangular holes; and a beam width is 20 mm to 40 mm.

In order to match a width of a powder to be fed with a width of a wide laser beam, the conventional circular powder-feeding outlet is widened to form a rectangular powder-feeding outlet. In order to achieve the even feeding of a powder through the entire rectangular powder-feeding outlet, the entire rectangular powder-feeding outlet is divided into a plurality of and preferably 7 small rectangular holes. In order to ensure that a powder entering from a central end is much distributed, left and right sides of the rectangular powder-feeding outlet are widened, such that a powder entering from an upper central end will be evenly fed through the 7 small rectangular holes. In this way, after a powder is ejected through the plurality of small rectangular holes and fed into a wide laser beam, the powder can be fully melted before reaching a workpiece, which improves the merging performance of the powder, reduces a rebound rate of the powder on a surface of the workpiece, and improves a utilization rate of the powder to 95%. While ensuring a prominent quality of additive manufacturing and cladding forming, the device is especially suitable for high-throughput additive manufacturing and cladding requiring the accurate control of a composition of a cladding zone.

Improvements of the present disclosure are as follows: 1. A large rectangular hole is divided into 7 small rectangular holes. 2. Left and right sides of a top of the rectangular powder-feeding outlet are widened, such that powders can be evenly fed through the 7 small rectangular holes, and under an action of a wide laser beam, and the powders are smoothly applied on a workpiece through additive manufacturing or cladding.

Preferably, the high-throughput powder-feeding system further includes a powder-feeding motor and a powder-feeding turntable; the powder-feeding motor is arranged inside a cabinet of the high-throughput powder-feeding system; an output shaft of the powder-feeding motor is connected to the powder-feeding turntable; and a rotational speed of the powder-feeding motor determines a rotational speed of the powder-feeding turntable, which is intended to control a mass of a powder falling to the powder-feeding turntable in a unit time.

Preferably, a pressure of a powder-feeding gas is adjusted by a gas pressure-reducing valve on an external gas-supply device (such as a gas cylinder), and a flow rate of the powder-feeding gas is adjusted by a gas flow meter on the cabinet of the high-throughput powder-feeding system.

The high-throughput powder-feeding system of the present disclosure is configured to establish a relationship between a component of a multi-component cladding material and a target property to obtain a sample array where each component is accurately controlled and continuously changes and different components correspond to different properties, so as to quickly provide appropriate components for different working conditions. The accurate control of a component is achieved through a combination of the powder feeding of the powder-feeding turntable driven by the powder-feeding motor and the negative-pressure powder feeding driven by the powder-feeding gas. The rotational speed of the powder-feeding turntable determines an amount of a powder supplied in a unit time, and the pressure and flow rate of the powder-feeding gas determine an amount of a powder taken away in a unit time. The rotational speed of the powder-feeding turntable and the pressure and flow rate of the powder-feeding gas can coordinate with each other to achieve the accurate control and the continuous change of one or more components. After gas-powder mixtures corresponding to different components arrive at the outlet of the nozzle through respective powder pipelines and powder channels, are fed into the rectangular powder-feeding outlet of the nozzle, and are then ejected through a plurality of small rectangular holes at the two sides of the nozzle, respectively, corresponding powders are fed simultaneously into a wide laser beam, and the powders have been fully merged and melted before reaching a workpiece. Through the coordination of the high-throughput powder-feeding system with the parameter setting of the mechanical motion system of the present disclosure, a sample array representing different components and properties can be produced after high-throughput additive manufacturing and cladding.

Preferably, powders required for additive manufacturing and cladding are filled into powder-feeding tanks in advance; at least two powder-feeding tanks are provided to supply powders of two different components; the powder-feeding tank A is filled with a single component or mixed component A, and the powder-feeding tank B is filled with a single component or mixed component B; and powders of the powder-feeding tank A and the powder-feeding tank B correspond respectively to two rows of powder-feeding grooves (7 small rectangular holes) at the two sides of the nozzle, and arrive at the outlet of the nozzle through respective powder pipelines and powder channels.

In a second aspect, the present disclosure provides a working method of the wide laser beam high-throughput additive-manufacturing and cladding device, including: connecting the external optical fiber to the optical fiber interface to input a laser, such that a divergent laser beam transmitted from the external optical fiber enters through the optical fiber interface and is converted into a collimated laser beam, then the collimated laser beam is accurately shaped into a rectangular beam from a circular beam through the DOE (which is specifically a beam-homogenizing component not sensitive to a beam size of an incident laser and a quality of a laser beam), then passes through the concentrating lens and the protective lens, and gathers at the outlet of the nozzle to obtain a rectangular wide laser beam at the outlet of the nozzle; adjusting the focus-adjusting sleeve to make a laser focus (although the laser focus is called a focus, the laser focus is actually a solid rectangular beam, and in this case, there is the smallest beam size and the highest energy density) matched with powder convergence points at the two sides of the nozzle, where because powders at the two sides are ejected through two rows of small rectangular holes, two convergence lines are actually formed, and the laser focus is at 2 mm above or below a powder convergence point; and delivering powders ejected simultaneously into a wide laser beam, where the powders are heated and melted at the moment of entering the wide laser beam, then partially-melted powders are mixed with each other, and the powders are fully merged and melted before reaching a workpiece to form a molten pool and a cladding layer together with the metal workpiece whose surface is melted.

Preferably, when the pressure and the flow rate of the powder-feeding gas are fixed, a mass of a powder to be fed is able to be accurately controlled by adjusting the rotational speed of the powder-feeding motor; and similarly, if the pressure of the powder-feeding gas and the rotational speed of the powder-feeding motor are fixed, a mass of a powder to be fed is able to be accurately controlled by adjusting the flow rate of the powder-feeding gas.

In the present disclosure, the powder feeding is driven by a gas instead of a gravity, which is based on a negative pressure principle. Gas flow-regulating valves include the gas pressure-reducing valve and the gas flow meter. A gas of a specified pressure is introduced through an inlet of a scaled powder-feeding tank, and is ejected through an outlet. There is a small pressure where a flow rate is high. A negative pressure is formed in a path through which a gas flow passes to adsorb a powder in a powder groove of the powder-feeding turntable, and the powder is delivered with the gas flow to a surface of a workpiece. The rotational speed of the powder-feeding turntable determines an amount of a powder supplied in a unit time, and the pressure and flow rate of the powder-feeding gas determine an amount of a powder taken away in a unit time.

In the present disclosure, masses of powders fed by the two powder-feeding tanks are jointly controlled accurately by adjusting the rotational speed of the powder-feeding motor and the pressure and flow rate of the powder-feeding gas of the powder-feeding system.

Preferably, during working, a mass of a powder fed by the powder-feeding tank A remains unchanged, that is, a proportion of the powder fed by the powder-feeding tank A into a molten pool remains unchanged, and the powder fed by the powder-feeding tank A is ejected through small rectangular holes of a powder-feeding groove at one side of the nozzle; a mass of a powder fed by the powder-feeding tank B changes in a continuous or boundary-leap manner, that is, a proportion of the powder fed by the powder-feeding tank B into the molten pool changes, and the powder fed by the powder-feeding tank B is ejected through small rectangular holes of a powder-feeding groove at the other side of the nozzle; a change of the mass of the powder fed by the powder-feeding tank B is matched with a workpiece; the powders ejected at the two sides of the nozzle converge in a wide laser beam; and a 20 mm to 40 mm additive manufacturing or cladding zone is formed after additive cladding, and a composition of the additive manufacturing or cladding zone changes in a continuous or stepped manner and is not fixed, which allows high-throughput powder-feeding. Sample units of different components are processed on a wide laser beam cladding zone to form a high-throughput sample array for abrasion, erosion, ablation, and other test comparison, which can provide powerful conditions for analyzing a relationship among a composition, a structure, and a property of a material and quickly screening component windows, and can greatly improve the optimization efficiencies for a composition and property of a material. Any content not detailed in the present disclosure can refer to the prior art.

The present disclosure has the following beneficial effects:

1. For a large number of large-scale workpieces working in ablation, abrasion, high-temperature, and low-temperature environments, the high-efficiency protection is required, and protective materials need to be designed in a targeted manner. In view of this, the present disclosure provides a wide laser beam high-throughput high-energy additive-manufacturing and cladding device and a working method thereof. Specifically, the device has functions such as wide laser beam laser additive manufacturing and cladding, high-throughput optimization, and accurate composition control.

2. In the present disclosure, an incident laser beam can be accurately shaped into a rectangular beam, passes through the concentrating lens and the protective lens, and then gathers at the outlet of the nozzle, and a laser focus is adjusted to make the laser focus and powders at the two sides of the nozzle converge, such that a laser beam with a beam width of 20 mm to 40 mm can be obtained and additive manufacturing and cladding can be conducted with a high efficiency.

Figure 4:
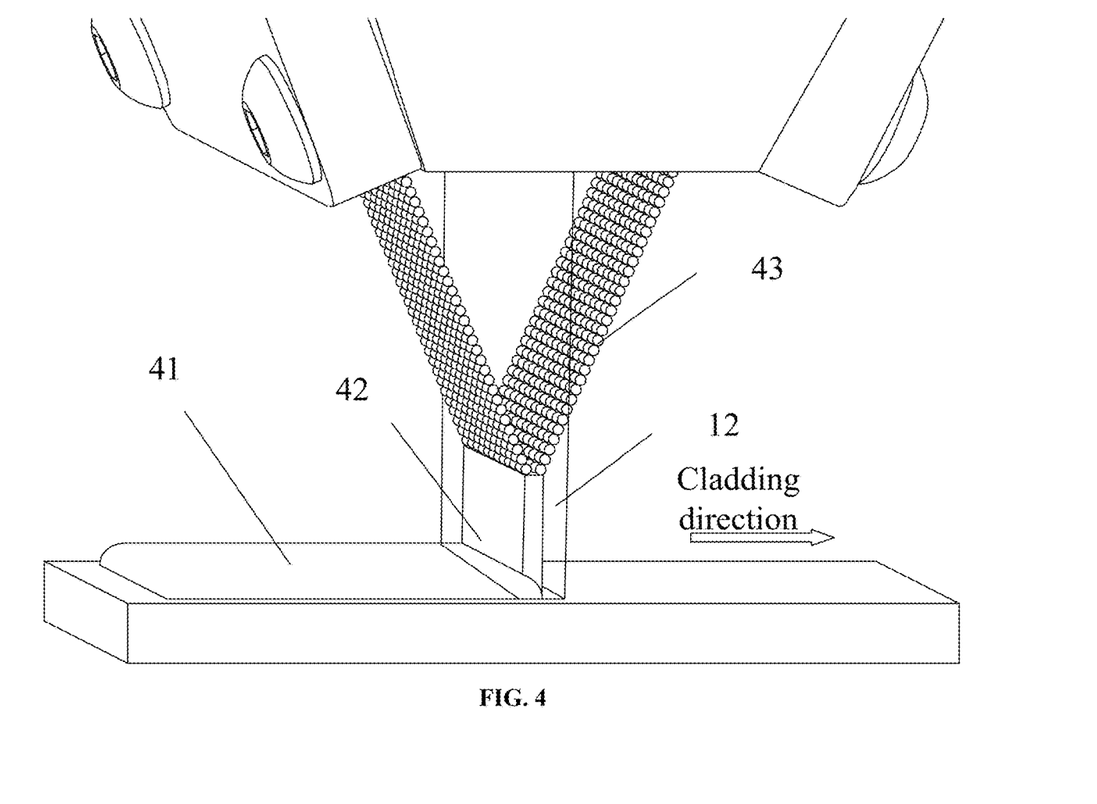
FIG. 4 shows an interaction between a wide laser beam laser beam and a small rectangular hole of the rectangular powder-feeding outlet.

3. In the present disclosure, a rectangular wide laser beam is produced at the outlet of the nozzle. In order to match a width of a powder to be fed with a width of a wide laser beam, the outlet of the nozzle is designed as a rectangular powder-feeding outlet. In order to achieve the even feeding of a powder through the entire rectangular powder-feeding outlet, the entire rectangular powder-feeding outlet is divided into 7 small rectangular holes. In this way, after a powder is ejected through the 7 small rectangular holes and fed into a wide laser beam, the powder can be fully melted before reaching a workpiece, which improves the merging performance of the powder, reduces a rebound rate of the powder on a surface of the workpiece, and improves a utilization rate of the powder to 95%. As shown in FIG. 4, while ensuring a prominent quality of additive manufacturing and cladding forming, the device is especially suitable for high-throughput additive manufacturing and cladding requiring the accurate control of a composition of a cladding zone.

4. In the present disclosure, a high-throughput powder-feeding system is further provided. For a multi-component cladding material with a complicated composition, it is necessary to establish a relationship between a component and a target property to obtain an appropriate component window. Through the high-throughput powder-feeding system, the accurate control is implemented through the joint adjustment of a rotational speed of the powder-feeding turntable by the powder-feeding motor to control a mass of a powder and the gas flow-regulating valves (including the gas pressure-reducing valve and the gas flow meter), such that one or more powder components change in a controlled continuous or boundary-leap manner and are not fixed. Such powder-feeding that changes in a controlled continuous or boundary-leap manner can cooperate with the parameter setting of the mechanical motion mechanism to obtain a sample array where each component is accurately controlled and continuously changes and different components correspond to different properties.

Figure 5:
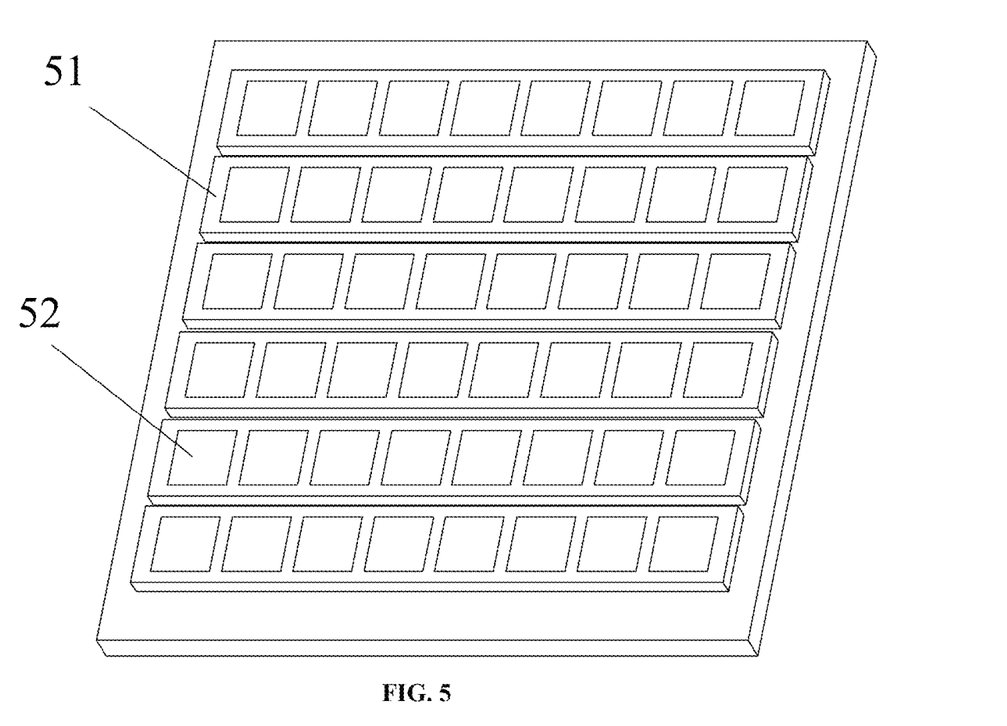
FIG. 5 is a schematic diagram of wide laser beam additive manufacturing and cladding zones and high-throughput sample arrays.

5. In the present disclosure, on a wide laser beam cladding zone, sample units of different components can be processed according to properties to be tested to form a high-throughput sample array. As shown in FIG. 5, the sample array is for abrasion, erosion, ablation, and other parallel test comparison and can greatly improve the optimization efficiencies for a composition and property of a material.

BRIEF DESCRIPTION OF THE DRAWINGS

The accompany drawings of the specification constituting a part of the present application provide further understanding of the present application. The schematic embodiments of the present application and description thereof are intended to be illustrative of the present application and do not constitute an undue limitation of the present application.

In the figures, 1: powder-feeding tank A, 2: powder-feeding tank B, 3: powder-feeding pipe, 4: optical fiber interface, 5: flange-arranging plate, 6: collimating lens, 7: DOE, 8: concentrating lens, 9: water-cooling interface, 10: protective lens, 11: central shielding gas, 12: wide laser beam, 13: focus-adjusting sleeve, 14: nozzle, 15: workpiece, 21: Wide-beam cladding head; 22: High-throughput powder-feeding system; 23: Mechanical motion system; 31: 7 small rectangular holes; 41: Wide-beam cladding zone; 42: Powder melt; 43: Powder; 51: Wide-beam cladding zone; and 52: Sample array.

DETAILED DESCRIPTION OF THE EMBODIMENTS

In order to make those skilled in the art well understand the technical solutions in the specification, the technical solutions in the embodiments of the specification are clearly and completely described below in conjunction with the accompanying drawings in the embodiments of the specification, but are not limited thereto. Those not described in detail in the present disclosure are the conventional techniques in the art.

Example 1

Figure 1:
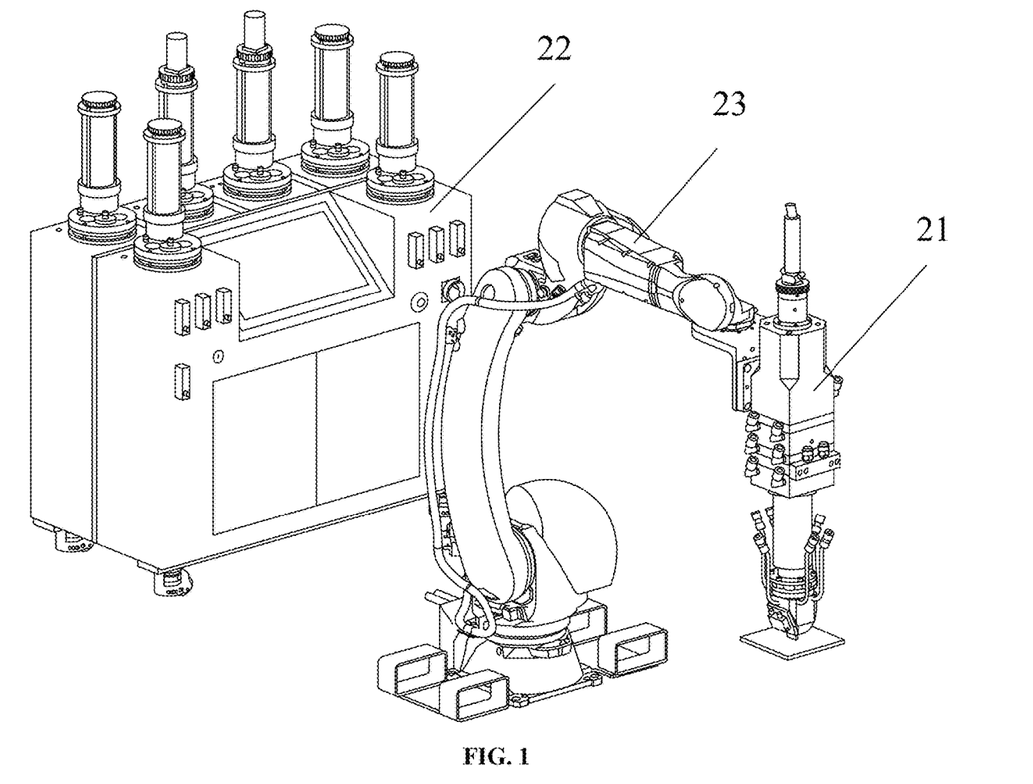
FIG. 1 is a schematic diagram of an overall structure of the wide laser beam high-throughput additive-manufacturing and cladding device of the present disclosure.

A wide laser beam high-throughput additive-manufacturing and cladding device is provided. As shown in FIG. 1, the device includes a wide laser beam cladding head, a high-throughput powder-feeding system, and a mechanical motion system. The wide laser beam cladding head is fixed on the mechanical motion system through a flange-arranging plate 5. The high-throughput powder-feeding system is configured to adjust a mass of a powder to be fed, and includes a powder-feeding tank A1 and a powder-feeding tank B2.

Figure 2:
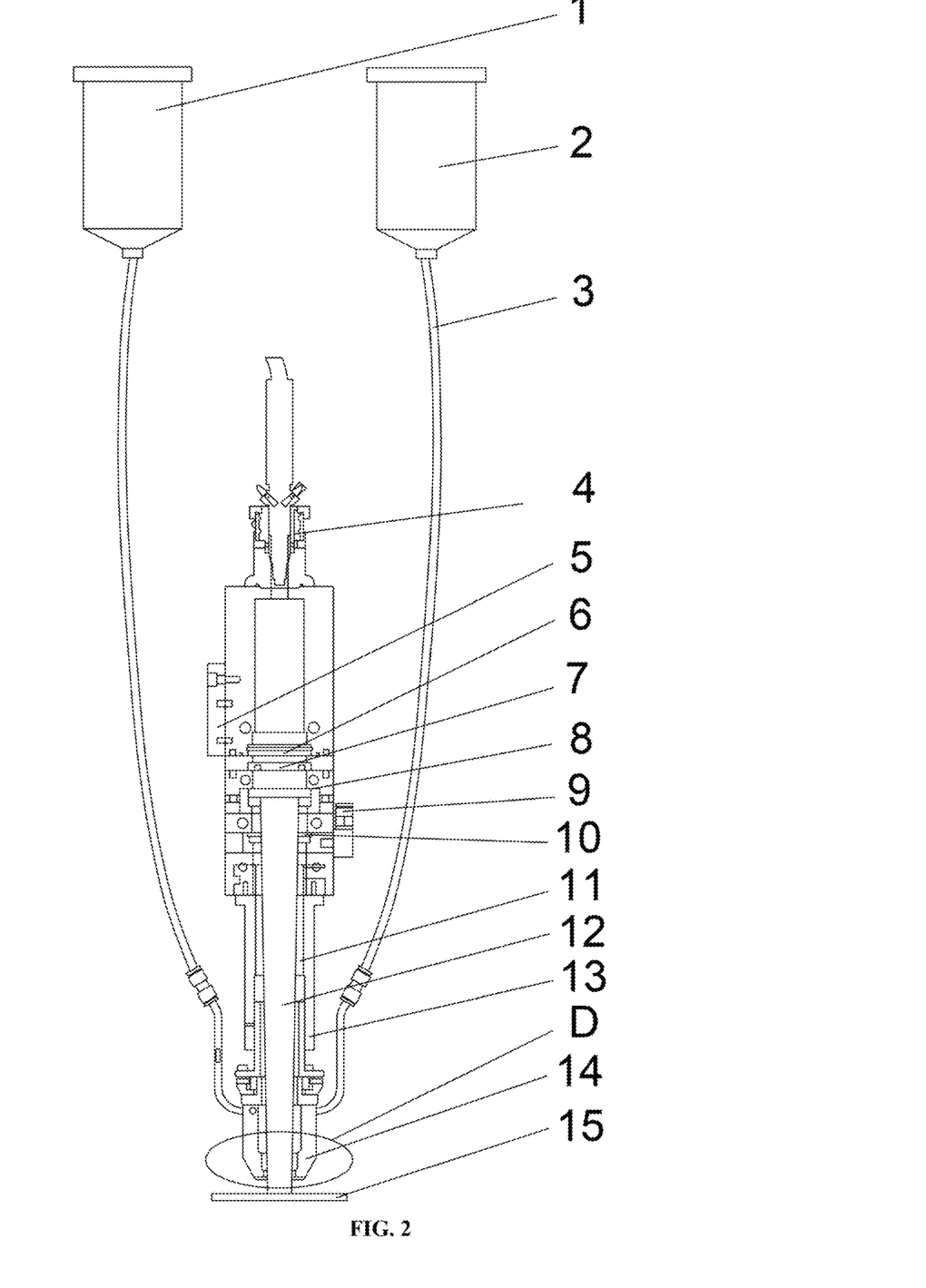
FIG. 2 is a schematic diagram of the gas-powder mixing path structure for synchronous powder feeding in the present disclosure.

The wide laser beam cladding head includes a laser shaping structure and a gas-powder mixing path structure for synchronous powder feeding. As shown in FIG. 2, the laser shaping structure includes a collimating lens 6, DOE 7, a concentrating lens 8, and a protective lens 10. The gas-powder mixing path structure for the synchronous powder feeding includes an optical fiber interface 4, a water-cooling interface 9, a central shielding gas 11, a focus-adjusting sleeve 13, and a nozzle 14. The powder-feeding tank A1 and the powder-feeding tank B2 are connected to a powder-feeding interface of the nozzle through a powder-feeding pipe 3. A cooling water pipe of an external cooling-water machine is connected with a plurality of water-cooling interfaces 9 to form a cooling water circulation. An external shielding gas is connected to a shielding-gas interface of the wide laser beam cladding head to provide the central shielding gas 11. An external optical fiber is connected to the optical fiber interface to input a laser, the laser passes through the collimating lens 6, the DOE 7, the concentrating lens 8, and the protective lens 10 successively, and a wide laser beam 12 is output at an outlet of the nozzle.

Figure 3:
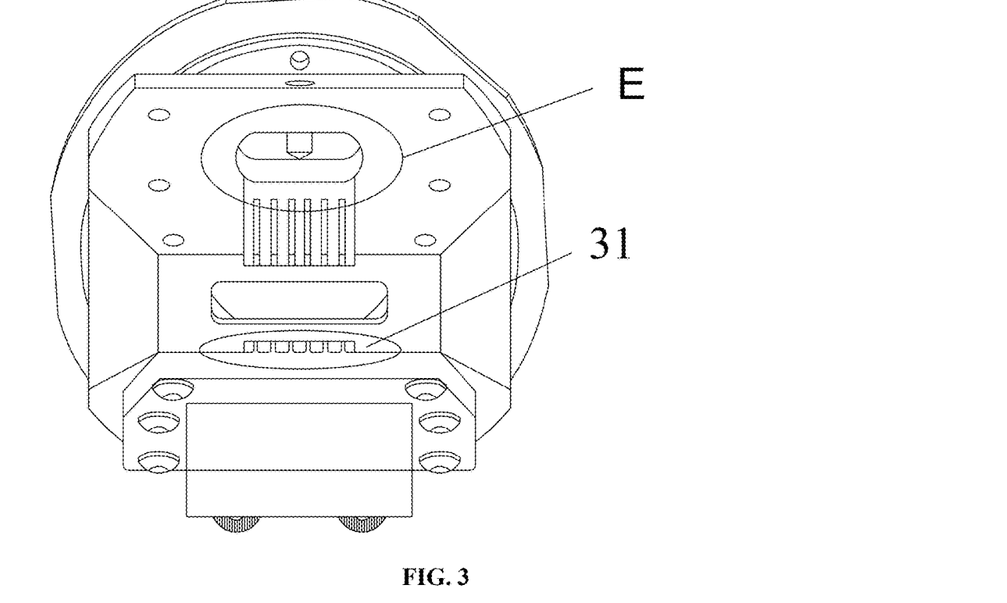
FIG. 3 is a schematic diagram of a structure of the powder-feeding groove in the present disclosure (namely, an enlarged view of a structure of the part D in FIG. 2)

A powder-feeding groove is formed at each of two sides of the nozzle 14. A powder is ejected through the powder-feeding groove. An outlet of the powder-feeding groove is a rectangular powder-feeding outlet, and the rectangular powder-feeding outlet is divided into 7 or more small rectangular holes. A beam width is 20 mm to 40 mm, as shown in FIG. 3.

In order to match a width of a powder to be fed with a width of a wide laser beam, the conventional circular powder-feeding outlet is widened to form a rectangular powder-feeding outlet. In order to achieve the even feeding of a powder through the entire rectangular powder-feeding outlet, the entire rectangular powder-feeding outlet is divided into a plurality of and preferably 7 small rectangular holes, as shown in an internal view where an E region in FIG. 3 is cut open. In order to ensure that a powder entering from a central end is much distributed, left and right sides of the rectangular powder-feeding outlet are widened, such that a powder entering from an upper central end will be evenly fed through the 7 small rectangular holes. In this way, after a powder is ejected through the plurality of small rectangular holes and fed into a wide laser beam, the powder can be fully melted before reaching a workpiece, which improves the merging performance of the powder, reduces a rebound rate of the powder on a surface of the workpiece, and improves a utilization rate of the powder to 95%. While ensuring a prominent quality of additive manufacturing and cladding forming, the device is especially suitable for high-throughput additive manufacturing and cladding requiring the accurate control of a composition of a cladding zone.

Improvements of the present disclosure are as follows: 1. A large rectangular hole is divided into 7 small rectangular holes. 2. Left and right sides of a top of the rectangular powder-feeding outlet are widened, such that powders can be evenly fed through the 7 small rectangular holes, and under an action of a wide laser beam, and the powders are smoothly applied on a workpiece through additive manufacturing or cladding.

Example 2

A wide laser beam high-throughput additive-manufacturing and cladding device is provided. This example is different from Example 1 in that: The high-throughput powder-feeding system further includes a powder-feeding motor and a powder-feeding turntable. The powder-feeding motor is arranged inside a cabinet of the high-throughput powder-feeding system. An output shaft of the powder-feeding motor is connected to the powder-feeding turntable. A rotational speed of the powder-feeding motor determines a rotational speed of the powder-feeding turntable, which is intended to control a mass of a powder falling to the powder-feeding turntable in a unit time.

A pressure of a powder-feeding gas is adjusted by a gas pressure-reducing valve on an external gas-supply device (such as a gas cylinder), and a flow rate of the powder-feeding gas is adjusted by a gas flow meter on a cabinet of the high-throughput powder-feeding system. Specifically, a source of a powder-feeding gas is the external gas-supply device (such as a gas cylinder). A main valve on the gas cylinder is opened, and when the powder-feeding gas passes through the gas pressure-reducing valve on the gas cylinder, the powder-feeding gas is adjusted to a required pressure. Then, when the powder-feeding gas is delivered by a gas transmission pipeline to the gas flow meter on the cabinet of the high-throughput powder-feeding system, the powder-feeding gas is adjusted to a required flow rate. Then the powder-feeding gas is delivered by a gas transmission pipeline to a powder-feeding tank, and finally is ejected through a powder-feeding pipe. That is, the powder-feeding gas first passes through the powder-feeding tank and then passes through the powder-feeding pipe.

Powders required for additive manufacturing and cladding are filled into powder-feeding tanks in advance. At least two powder-feeding tanks are provided to supply powders of two different components. The powder-feeding tank A is filled with a single component or mixed component A, and the powder-feeding tank B is filled with a single component or mixed component B. Powders of the powder-feeding tank A and the powder-feeding tank B correspond respectively to two rows of powder-feeding grooves (7 small rectangular holes) at the two sides of the nozzle, and arrive at the outlet of the nozzle through respective powder pipelines and powder channels.

The high-throughput powder-feeding system of the present disclosure is configured to establish a relationship between a component of a multi-component cladding material and a target property to obtain a sample array where each component is accurately controlled and continuously changes and different components correspond to different properties, so as to quickly provide appropriate components for different working conditions. The accurate control of a component is achieved through a combination of the powder feeding of the powder-feeding turntable driven by the powder-feeding motor and the negative-pressure powder feeding driven by the powder-feeding gas. The rotational speed of the powder-feeding turntable determines an amount of a powder supplied in a unit time, and the pressure and flow rate of the powder-feeding gas determine an amount of a powder taken away in a unit time. The rotational speed of the powder-feeding turntable and the pressure and flow rate of the powder-feeding gas can coordinate with each other to achieve the accurate control and the continuous change of one or more components. After gas-powder mixtures corresponding to different components arrive at the outlet of the nozzle through respective powder pipelines and powder channels, are fed into the rectangular powder-feeding outlet of the nozzle, and are then ejected through a plurality of small rectangular holes at the two sides of the nozzle, respectively, corresponding powders are fed simultaneously into a wide laser beam, and the powders have been fully merged and melted before reaching a workpiece. Through the coordination of the high-throughput powder-feeding system with the parameter setting of the mechanical motion system of the present disclosure, a sample array representing different components and properties can be produced after high-throughput additive manufacturing and cladding.

Example 3

A working method of the wide laser beam high-throughput additive-manufacturing and cladding device is provided, including: The external optical fiber is connected to the optical fiber interface to input a laser, such that a divergent laser beam transmitted from the external optical fiber enters through the optical fiber interface and is converted into a collimated laser beam, then the collimated laser beam is accurately shaped into a rectangular beam from a circular beam through the DOE 7 (which is specifically a beam-homogenizing component not sensitive to a beam size of an incident laser and a quality of a laser beam), then passes through the concentrating lens 8 and the protective lens 10, and gathers at the outlet of the nozzle 14 to obtain a rectangular wide laser beam 12 at the outlet of the nozzle. The focus-adjusting sleeve 13 is adjusted to make a laser focus (although the laser focus is called a focus, the laser focus is actually a solid rectangular beam, and in this case, there is the smallest beam size and the highest energy density) matched with powder convergence points at the two sides of the nozzle. Because powders at the two sides are ejected through two rows of small rectangular holes, two convergence lines are actually formed, and the laser focus is at 2 mm above or below a powder convergence point. Powders ejected are delivered simultaneously into a wide laser beam. The powders are heated and melted at the moment of entering the wide laser beam, and then partially-melted powders are mixed with each other. An interaction between a wide laser beam and a powder ejected through small rectangular holes of the rectangular powder-feeding outlet is shown in FIG. 4. The powders are fully merged and melted before reaching a workpiece 15 to form a molten pool and a cladding layer together with the metal workpiece whose surface is melted.

When the pressure and the flow rate of the powder-feeding gas are fixed, a mass of a powder to be fed is able to be accurately controlled by adjusting the rotational speed of the powder-feeding motor. Similarly, if the pressure of the powder-feeding gas and the rotational speed of the powder-feeding motor are fixed, a mass of a powder to be fed is able to be accurately controlled by adjusting the flow rate of the powder-feeding gas.

In the present disclosure, the powder feeding is driven by a gas instead of a gravity, which is based on a negative pressure principle. Gas flow-regulating valves include the gas pressure-reducing valve and the gas flow meter. A gas of a specified pressure is introduced through an inlet of a sealed powder-feeding tank, and is ejected through an outlet. There is a small pressure where a flow rate is high. A negative pressure is formed in a path through which a gas flow passes to adsorb a powder in a powder groove of the powder-feeding turntable, and the powder is delivered with the gas flow to a surface of a workpiece. The rotational speed of the powder-feeding turntable determines an amount of a powder supplied in a unit time, and the pressure and flow rate of the powder-feeding gas determine an amount of a powder taken away in a unit time.

In the present disclosure, masses of powders fed by the two powder-feeding tanks are jointly controlled accurately by adjusting the rotational speed of the powder-feeding motor and the pressure and flow rate of the powder-feeding gas of the powder-feeding system.

During working, a mass of a powder fed by the powder-feeding tank A1 remains unchanged, that is, a proportion of the powder fed by the powder-feeding tank A into a molten pool remains unchanged, and the powder fed by the powder-feeding tank A1 is ejected through small rectangular holes of a powder-feeding groove at one side of the nozzle. A mass of a powder fed by the powder-feeding tank B2 changes in a continuous or boundary-leap manner, that is, a proportion of the powder fed by the powder-feeding tank B2 into the molten pool changes, and the powder fed by the powder-feeding tank B2 is ejected through small rectangular holes of a powder-feeding groove at the other side of the nozzle. A change of the mass of the powder fed by the powder-feeding tank B is matched with the workpiece 15. The powders ejected at the two sides of the nozzle converge in a wide laser beam 12. A 20 mm to 40 mm additive manufacturing or cladding zone is formed after additive cladding, and a composition of the additive manufacturing or cladding zone changes in a continuous or stepped manner and is not fixed, which allows high-throughput powder-feeding. Sample units of different components are processed on a wide laser beam cladding zone to form a high-throughput sample array for abrasion, erosion, ablation, and other test comparison, as shown in FIG. 5, which can provide powerful conditions for analyzing a relationship among a composition, a structure, and a property of a material and quickly screening component windows, and can greatly improve the optimization efficiencies for a composition and property of a material.

The above are preferred implementations of the present disclosure. It should be noted that a person of ordinary skill in the art may further make several improvements and modifications without departing from the principle of the present disclosure, but such improvements and modifications should also be deemed as falling within the protection scope of the present disclosure.

What is claimed is:

1. A wide laser beam high-throughput additive-manufacturing and cladding device, comprising a wide laser beam cladding head, a high-throughput powder-feeding system, and a mechanical motion system, wherein the wide laser beam cladding head is fixed on the mechanical motion system through a flange-arranging plate; the high-throughput powder-feeding system is configured to adjust a mass of a powder to be fed, and comprises a powder-feeding tank A and a powder-feeding tank B;

the wide laser beam cladding head comprises a laser shaping structure and a gas-powder mixing path structure for synchronous powder feeding; the laser shaping structure comprises a collimating lens, a diffractive optical element (DOE), a concentrating lens, and a protective lens; the gas-powder mixing path structure for the synchronous powder feeding comprises an optical fiber interface, a water-cooling interface, a central shielding gas, a focus-adjusting sleeve, and a nozzle; the powder-feeding tank A and the powder-feeding tank B are connected to a powder-feeding interface of the nozzle through a powder-feeding pipe; a cooling water pipe of an external cooling-water machine is connected with a plurality of water-cooling interfaces to form a cooling water circulation; an external shielding gas is connected to a shielding-gas interface of the wide laser beam cladding head to provide the central shielding gas; and an external optical fiber is connected to the optical fiber interface to input a laser, the laser passes through the collimating lens, the DOE, the concentrating lens, and the protective lens successively, and a wide laser beam is output at an outlet of the nozzle.

2. The wide laser beam high-throughput additive-manufacturing and cladding device according to claim 1, wherein a powder-feeding groove is formed at each of two sides of the nozzle; a powder is ejected through the powder-feeding groove; an outlet of the powder-feeding groove is a rectangular powder-feeding outlet, and the rectangular powder-feeding outlet is divided into 7 or more small rectangular holes; and a beam width is 20 mm to 40 mm.

3. The wide laser beam high-throughput additive-manufacturing and cladding device according to claim 2, wherein the high-throughput powder-feeding system further comprises a powder-feeding motor and a powder-feeding turntable; the powder-feeding motor is arranged inside a cabinet of the high-throughput powder-feeding system; an output shaft of the powder-feeding motor is connected to the powder-feeding turntable; and a rotational speed of the powder-feeding motor determines a rotational speed of the powder-feeding turntable, which is intended to control a mass of a powder falling to the powder-feeding turntable in a unit time.

4. The wide laser beam high-throughput additive-manufacturing and cladding device according to claim 3, wherein a pressure of a powder-feeding gas is adjusted by a gas pressure-reducing valve on an external gas-supply device, and a flow rate of the powder-feeding gas is adjusted by a gas flow meter on the cabinet of the high-throughput powder-feeding system.

5. The wide laser beam high-throughput additive-manufacturing and cladding device according to claim 4, wherein at least two powder-feeding tanks are provided; the powder-feeding tank A is filled with a single component or mixed component A, and the powder-feeding tank B is filled with a single component or mixed component B; and powders of the powder-feeding tank A and the powder-feeding tank B correspond respectively to two rows of powder-feeding grooves at the two sides of the nozzle, and arrive at the outlet of the nozzle through respective powder pipelines and powder channels.

6. A working method of the wide laser beam high-throughput additive-manufacturing and cladding device according to claim 5, comprising: connecting the external optical fiber to the optical fiber interface to input a laser, such that a divergent laser beam transmitted from the external optical fiber enters through the optical fiber interface and is converted into a collimated laser beam, then the collimated laser beam is shaped into a rectangular laser beam from a circular laser beam through the DOE, then passes through the concentrating lens and the protective lens, and gathers at the outlet of the nozzle to obtain a rectangular wide laser beam at the outlet of the nozzle; adjusting the focus-adjusting sleeve to make a laser focus matched with powder convergence points at the two sides of the nozzle, wherein because powders at the two sides are ejected through two rows of small rectangular holes, two convergence lines are actually formed, and the laser focus is at 2 mm above or below a powder convergence point; and delivering powders ejected simultaneously into a wide laser beam, wherein the powders are heated and melted at the moment of entering the wide laser beam, then partially-melted powders are mixed with each other, and the powders are fully merged and melted before reaching a workpiece.

7. The working method of the wide laser beam high-throughput additive-manufacturing and cladding device according to claim 6, wherein when the pressure and the flow rate of the powder-feeding gas are fixed, a mass of a powder to be fed is able to be accurately controlled by adjusting the rotational speed of the powder-feeding motor; and if the pressure of the powder-feeding gas and the rotational speed of the powder-feeding motor are fixed, a mass of a powder to be fed is able to be accurately controlled by adjusting the flow rate of the powder-feeding gas.

8. The working method of the wide laser beam high-throughput additive-manufacturing and cladding device according to claim 7, wherein during working, a mass of a powder fed by the powder-feeding tank A remains unchanged, that is, a proportion of the powder fed by the powder-feeding tank A into a molten pool remains unchanged, and the powder fed by the powder-feeding tank A is ejected through small rectangular holes of a powder-feeding groove at one side of the nozzle; a mass of a powder fed by the powder-feeding tank B changes in a continuous or boundary-leap manner, that is, a proportion of the powder fed by the powder-feeding tank B into the molten pool changes, and the powder fed by the powder-feeding tank B is ejected through small rectangular holes of a powder-feeding groove at the other side of the nozzle; a change of the mass of the powder fed by the powder-feeding tank B is matched with a workpiece; the powders ejected at the two sides of the nozzle converge in a wide laser beam; and a 20 mm to 40 mm additive manufacturing or cladding zone is formed after additive cladding, and a composition of the additive manufacturing or cladding zone changes in a continuous or stepped manner, which allows high-throughput powder-feeding.

* * * * *